May 29, 1956  H. M. COOK  2,747,663
YARN CUTTER
Filed Dec. 28, 1951
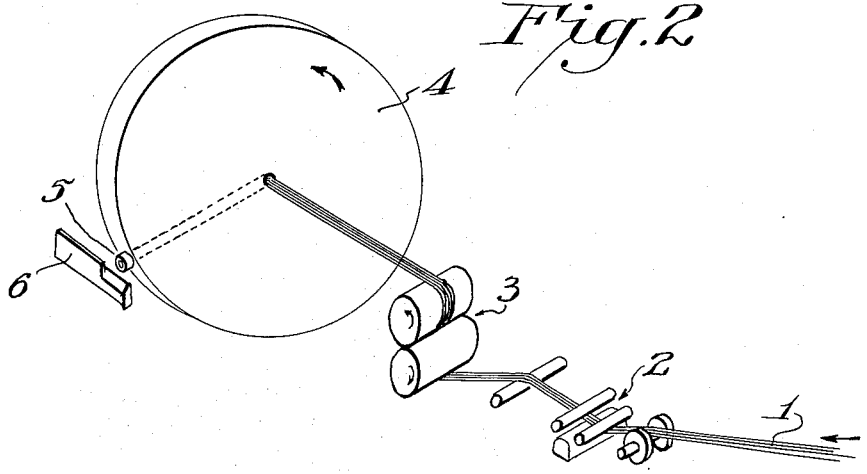
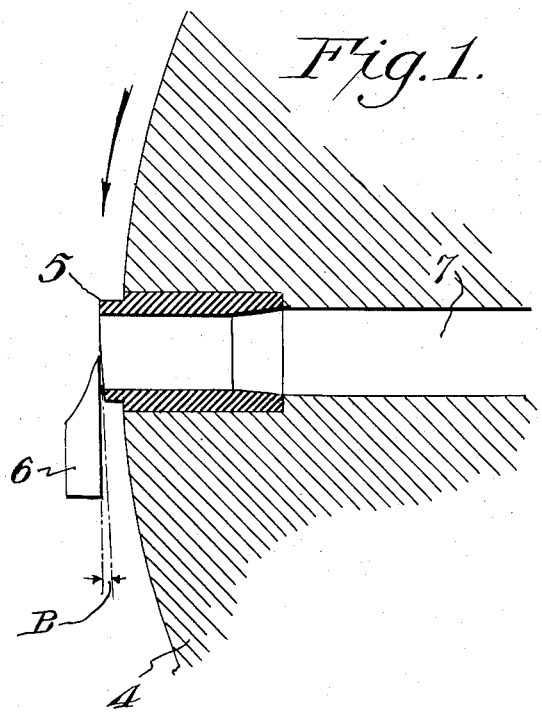
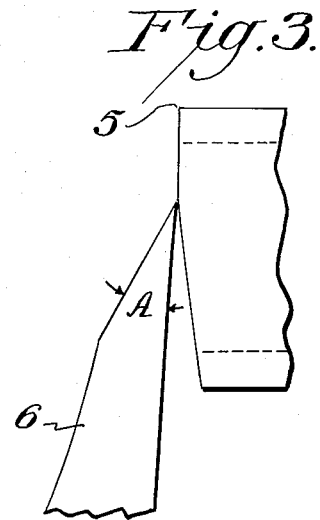
INVENTOR.
Harry M. Cook
BY C. H. Mortenson
ATTORNEY.

United States Patent Office 2,747,663
Patented May 29, 1956

2,747,663

YARN CUTTER

Harry M. Cook, Staunton, Va., assignor to E. I. du Pont de Nemours and Company, Wilmington, Del., a corporation of Delaware Application December 28, 1951, Serial No. 263,806

14 Claims. (Cl. 164—38)

This invention relates to an improved cutter for converting continuous filament yarn or tow into staple.

In U. S. Patent 1,723,998 to Beria, there is described a cutter comprised of a revolvable disc having an axial bore turned to a radial channel. When the disc is rapidly rotated and yarn or the like is fed therethrough exiting from the radial channel, substantial centrifugal force is created which acts on the yarn to tension it and present the tensioned filaments to a stationary cutter. Usually the cutting knife is located some thousandths of an inch from the periphery of the disc to avoid contact therewith. However, U. S. Patent 2,394,603 to Folsom describes shear cutting using a centrifugal disc cutter of the Beria type, wherein the terminus of the radial channel is fitted with an insert, the face of which extends beyond the periphery of the disc and coacts with the fixed knife at the time of cutting.

The application of the shear cutting principle to apparatus of this type is especially desirable for cutting certain kinds of filaments, such as, of acrylonitrile polymers. However, with the usual nozzle and knife materials, it was found impossible to keep the knife sharp or to effect satisfactory cutting for any reasonable length of time. In spite of redesigning and rebuilding the cutter with more perfect bearings and more rigidly mounting the knife, unbalance still occurred during start-up. The results were very unsatisfactory, and the knife edge was soon dulled and chipped. The disc is brought up to speed before the tow or yarn is introduced. The introduction of the tow causes unbalance and increases the circle of rotation very slightly. However, if the knife is adjusted to just contact, even a slight unbalance is enough for a hard nozzle to nick or chip the knife.

It is therefore an object of this invention to provide an improved arrangement of shear cutting members in a cutter of the Beria type that will prolong the life of the cutting blade while producing stapple of uniform length. Other objects will be apparent from the description which follows:

The objects of this invention are accomplished by using an insert, or a knife-contacting nozzle, protruding from the exit end of the radial passage of the disc that is resistant to substantial deformation under the action of the centrifugal force created but is easily shaved or cut by the knife without noticeably dulling the cutting edge. In order to conform to these essential requirements the nozzle must possess a certain degree of hardness which is defined as within the limits of 12 to 90 on the Knoop hardness scale. The Knoop test for hardness is described in Metals Handbook, 1948 edition published by the American Society for Metals, on page 96 under the section headed "The Tukon Tester." Preferred nozzle materials have a Knoop hardness of about 15 to 80, and usually those having values of 60 or less are used.

Materials falling within this general hardness range and suitable for the nozzle of this invention include the lead alloys such as the lead-tin solders or the babbitts or bearing alloys comprised preponderantly of lead but also containing up to 10% or more of copper, up to 20% of tin, antimony or bismuth with or without minor amounts of arsenic, zinc, cadmium, etc.; the alloys rich in tin such as the tine babbitts containing in addition to a preponderant amount of tin, up to 10% of antimony and up to 10% copper; alloys of copper and lead wherein the copper is predominant with from 30% to 40% lead; alloys rich in bismuth such as rose metal; and other metal alloys of this type such as will readily occur to one skilled in the art. Also, numerous organic plastic materials may be used for formation of the nozzle such as methyl methacrylate polymers and other acrylic polymers, nylon, polystyrene, vinylidene halide interpolymers such as the vinylidene chloride-vinyl chloride copolymer, vinyl chloride-vinyl acetate copolymers, etc.

In addition to forming the protruding nozzle from the right material it also is desirable to provide the proper knife edge and mounting as will be described hereinbelow.

Figure 1 illustrates the angles of the knife edge and mounting and relative position with respect to the nozzle insert of the revolving disc.

Figure 2 shows the schematic arrangement of the cutter and tow being fed thereto.

Figure 3 is an enlarged view of the cutting edge of the knife.

With reference to Figure 2, a tow 1 of continuous filaments is fed from a suitable source of supply over or under guide members 2 to pretension the tow and straighten out any loose filaments and thence to the feed rolls 3 of the cutter. The feed rolls serve to meter the tow to the revolving disc 4 of the cutter in timed relation to the rotary speed of the disc and the length of staple desired. The operating speed of the disc is usually in the range of from 1,500 to 4,000 R. P. M. and is mounted so as to produce the minimum of vibration. The exit end of the radial channel is fitted with a nozzle 5 as shown in detail in Figure 1. This nozzle is preferably a high, lead alloy nozzle composed of about 83% lead, about 16% antimony, a small amount of tin and a small fraction of per cent of iron. This alloy called "Magnolia Metal" has a Knoop hardness value of about 28. Other specific materials in the range of Knoop hardness values given above which have been used with very satisfactory results are copper hardened babbitt, 50/50 lead-tin solder, rose metal, Lucite, nylon and polystyrene. Materials which have a Knoop hardness above about 90 chipped and quickly dulled the knife 6, while materials substantially softer than a Knoop hardness of 12 are too soft and deformable to withstand the repeated shock of knife contact.

Figure 1 shows an enlarged section of the disc 4, the radial channel 7 therein, and the nozzle location relative to the position of the knife. The outer end of the nozzle is bevelled off on the side approaching the knife so that the knife contact is made only at the rear third or so of the nozzle, as shown in Figure 3. The knife is ground to a cutting edge of from 25° to 35°, as represented by angle A in Figure 3, and is mounted to give a clearance angle, angle B in Figure 1, of about 2½° to 3½°, although this clearance angle may vary from 0° to 5°. The clearance angle is defined as the angle formed between the line of tangency of the nozzle at knife contact and the back of the knife.

The knife may be of any good quality hardened tool steel and a very satisfactory knife material is SAE–1095 steel. Rex AA tool steel, which is an 18–4–1 type high speed steel containing tungsten carbide in the micro structure, may also be used with good results.

When the reasonably rigid but relatively soft nozzle of this invention is brought into initial contact with the hard tool steel knife, the nozzle end is shaved thereby forming a cooperative contact cutting surface, which is maintained for long periods of cutting including several starts and stops. It is unnecessary to reset the knife with each start-up unless the tow of yarn has been fouled or jammed in the cutter passage and has thus caused substantial unbalance and resultant excessive shaving of the nozzle. The nozzle is thus gradually cut away, but it protrudes sufficiently so that it lasts a long time before the knife gets too close to the disc. The nozzles are inexpensive, but even so, several thousand pounds of polyacrylonitrile filaments in the form of a tow may be cut before the need of nozzle replacement. The knife life is increased several fold and 25,000 lbs. and more of 2½" staple were produced from a tow of continuous polyacrylonitrile filaments before it became necessary to resharpen the knife blade and even at this time the knife edge was not noticeably nicked or gouged. Prior to the use of this invention, a bronze nozzle was used in the disc, carefully adjusted to just contact the knife and it frequently happened that no more than 265 lbs. of tow could be cut before the knife had to be reground due to large nicks and gouges formed therein.

Metallurgical treatment of metals has a profound effect on their physical properties including hardness. Many metals and alloys in a dead soft state will have the desired degree of softness for use in the nozzle of this invention whereas if work-hardened or heat-treated, they may not be at all satisfactory. Some useful materials of this type are aluminum, copper and alloys thereof. For instance, soft copper may have a Knoop hardness of the order of 70–80 while working may increase this hardness value to 150 or more. Certain copper alloys in unworked condition vary from about 50 to 80 in Knoop hardness. Substantially pure aluminum may be as low as 29 in Knoop hardness or depending on the degree of working may be 40, 50 or more, or as high as 100 in Knoop hardness. It is the unworked or only slightly worked metals and alloys of this group that are useful in the present invention as nozzle material, e. g. those that show Knoop hardness values below 80 or 90 and preferably below 60. For example, an aluminum metal having a Knoop hardness value of 126 and a copper metal having also a hardness of 126 were unsatisfactory for the purposes of this invention. So also was Johnson bronze having a hardness of 202.

Other metals that show less hardening by working such as magnesium and zinc are also satisfactory as nozzle materials. Magnesium in various forms has Knoop hardness values of from about 35 to about 70 and zinc has a Knoop hardness value of about 75.

It may be that useable materials will work-harden during use, but so long as their Knoop hardness remains below 80 to 90, they will be satisfactory, since the nozzle will be shaved without serious dulling of the knife edge.

The prolonged knife life achieved by this invention is of great advantage for frequent shut-downs are eliminated and material costs are reduced.

Any departure from the above description which conforms to the present invention is intended to be included within the scope of the claims.

I claim:

1. In apparatus for producing staple fibers from continuous filaments comprising a stationary knife and a rotating member having a passageway therein to feed said filaments through said member to said knife, an insert in said passageway protruding from the exit end of said passageway, said insert being composed of a soft, shaveable material.

2. In apparatus for producing staple fibers from continuous filaments comprising a stationary knife and a rotating member having a passageway therein to feed said filaments through said member to said knife, an insert in said passageway protruding from the exit end of said passageway, said insert being composed of a soft, shaveable material having a Knoop hardness value of at least 12.

3. In apparatus for producing stable fibers from continuous filaments comprising a stationary knife and a rotating member having a passageway therein to feed said filaments through said member to said knife, an insert in said passageway protruding from the exit end of said passageway, said insert being composed of a material having a Knoop hardness value of about 12 to about 90.

4. Apparatus in accordance with claim 3 wherein said material has a hardness of about 15 to about 60.

5. Apparatus in accordance with claim 3 wherein said material has a hardness of about 28.

6. Apparatus in accordance with claim 3 wherein said material is an alloy of about 83% lead and about 16% antimony.

7. Apparatus in accordance with claim 3 wherein the outer end of said insert is beveled off on the side approaching said knife so that the knife contact is made only over about the rear third of said insert.

8. Apparatus in accordance with claim 3 wherein said knife has a cutting edge of about 25° to about 35°.

9. Apparatus in accordance with claim 3 wherein said knife is mounted at a clearance angle of about 0° to about 5°.

10. Apparatus in accordance with claim 9 wherein said clearance angle is about 2.5° to about 3.5°.

11. In apparatus for producing staple fibers from continuous filaments comprising a stationary knife and a rotating member having a passageway therein to feed said filaments through said member to said knife, a knife-contacting nozzle protruding from the exit end of said passageway, said nozzle being of a material that is resistant to substantial deformation under the action of centrifugal force and that is readily cut by said knife without substantially dulling said knife.

12. In apparatus for cutting fibers comprising a knife and a rotating member having a passageway therein to feed said fibers through said member to said knife, a cooperative contact cutter comprising said knife and a knife-contacting nozzle protruding from the exit end of said passageway, said nozzle being composed of a soft shaveable material adapted to be easily shaved by said knife to maintain the balance between said knife and said rotating member.

13. Apparatus in accordance with claim 12 wherein said soft material has a Knoop hardness value of about 12 to about 90.

14. Apparatus in accordance with claim 12 wherein said soft material has a Knoop hardness value of about 12 to about 90 and said knife is mounted at a clearance angle of about 0° to about 5°.

References Cited in the file of this patent

UNITED STATES PATENTS

| | | |
|---|---|---|
| 344,822 | Fiske | July 6, 1886 |
| 542,689 | Sheffield | July 16, 1895 |
| 1,443,327 | Tourtellot | Jan. 23, 1923 |
| 1,485,886 | Russell | Mar. 4, 1924 |
| 1,533,124 | Lindsay | Apr. 14, 1925 |
| 1,617,801 | Frick | Feb. 15, 1927 |
| 2,232,496 | Thompson | Feb. 18, 1941 |
| 2,394,603 | Folsom et al. | Feb. 12, 1946 |
| 2,405,598 | Miller | Aug. 13, 1946 |
| 2,411,644 | Welton | Nov. 26, 1946 |
| 2,426,757 | Wicker | Sept. 2, 1947 |
| 2,575,378 | Bender | Nov. 20, 1951 |
| 2,631,667 | Schmitz | Mar. 17, 1953 |

OTHER REFERENCES

Netherlands Vereinigte etc., 55,755, Dec. 15, 1943.